United States Patent
Budal et al.

(10) Patent No.: US 7,044,280 B2
(45) Date of Patent: May 16, 2006

(54) METHOD FOR ADAPTING THE CLUTCH CHARACTERISTICS IN A TWIN-CLUTCH SYSTEM

(75) Inventors: Lidvar Budal, Kongsberg (NO);
Dietmar Lang, Höhelschweiler (DE);
Alexander Schweizer, Walzbachtal-Jöhlingen (DE); Brad Shellhammer, Bühl (DE); Jeremy Whitmer, Bühl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 10/711,225

(22) Filed: Sep. 2, 2004

(65) Prior Publication Data

US 2005/0061599 A1 Mar. 24, 2005

Related U.S. Application Data (63) Continuation of application No. PCT/DE03/00650, filed on Feb. 28, 2003.

(30) Foreign Application Priority Data

Mar. 7, 2002 (DE) .............................. 102 09 917

(51) Int. Cl.
*F16D 21/04* (2006.01)
(52) U.S. Cl. ................................. 192/48.9; 192/110 R
(58) Field of Classification Search .............. 192/48.8, 192/48.9, 110 R, 111 A; 701/67, 68
See application file for complete search history.

(56) References Cited

U.S. PATENT DOCUMENTS

| | | | | |
|---|---|---|---|---|
| 5,065,849 A | * | 11/1991 | Kono et al. | 477/86 |
| 5,065,851 A | * | 11/1991 | Otsuka et al. | 192/103 R |
| 5,335,174 A | * | 8/1994 | Kohno et al. | 701/68 |
| 5,393,274 A | * | 2/1995 | Smedley | 477/74 |
| 6,276,504 B1 | * | 8/2001 | Tscheplak et al. | 192/48.8 |
| 6,729,456 B1 | * | 5/2004 | Beneton et al. | 192/48.8 |
| 6,819,997 B1 | * | 11/2004 | Buchanan et al. | 701/67 |
| 2004/0255707 A1 | * | 12/2004 | Preisner et al. | 74/335 |

* cited by examiner

*Primary Examiner*—Richard M. Lorence
(74) *Attorney, Agent, or Firm*—Simpson & Simpson, PLLC (57) ABSTRACT

The invention relates to a method for adapting the clutch characteristics in a twin-clutch system (PSG) which comprises in a first train a first clutch (A) and a first partial transmission (iA) mounted downstream thereof, and in a second train a second clutch (B) and a partial transmission (iB) mounted downstream thereof. The first and the second train can be linked on the input side with a driving engine (M) and on the output side with the wheels of a vehicle. The first clutch (A) is actuated by a first clutch actuating mechanism (KA) and the second clutch (B) is actuated by a second clutch actuating mechanism (KB). A zero adjustment of the hodometry of the first and/or second clutch actuating mechanism (KA; KB) is carried out according to a predetermined strategy subject to predetermined criteria.

16 Claims, 8 Drawing Sheets

METHOD FOR ADAPTING THE CLUTCH CHARACTERISTICS IN A TWIN-CLUTCH SYSTEM

CROSS-REFERENCE TO RELATED APPLICATIONS

This application is filed under 35 U.S.C. § 120 and § 365 (c) as a continuation of International Patent Application PCT/DE03/00650, filed Feb. 28, 2003, which application is incorporated herein by reference. This application also claims priority of German Patent Application No. 102 09 917.0, filed Mar. 7, 2002, which application is incorporated herein by reference.

BACKGROUND OF THE INVENTION

The present invention relates to a method for adapting the clutch characteristics in a twin-clutch system.

The electromechanical clutch actuating mechanism may be divided up into essentially three components, especially in automated shift manual transmissions. In this context, the first component relates to the clutch actuator that comprises a drive unit, which is, for example, an electric motor, and a displacement unit and is regulated by the control software. The second component is a clutch release mechanism that transfers the disengagement force of the drive unit to the diaphragm spring of the clutch. The third component relates exclusively to a transmission system for the transmission of mechanical forces between the clutch actuator and the clutch release mechanism. For example, the transmission system comprises a lever mechanism, a mechanical shaft and/or hydraulic lines, etc.

With this clutch actuating mechanism, the actuation of the clutch may occur by driving against a specific position of the drive unit of the clutch actuator. The clutch release mechanism is actuated by the transmission system, and the clutch is either engaged or disengaged, or a specific torque is set. The position of the drive unit can preferably be monitored with absolute displacement sensors. The conversion to a transmitted clutch torque is calculated in the control software via the clutch characteristic in which the transmission function "Torque via the master cylinder displacement" is stored.

OBJECTS OF THE INVENTION

The object of the present invention is to specify a method for adapting the clutch characteristics in parallel shift transmissions by which a correction of the transmission behavior of clutches is possible in twin-clutch systems or parallel shift transmissions.

This objective is achieved using a method for adapting the clutch characteristics in a twin-clutch system that comprises in a first branch a first clutch and a first partial transmission mounted downstream thereof, and in a second branch a second clutch and a second partial transmission mounted downstream thereof, the first and second branches being connectable on the input side to an engine and then the output side to the vehicle wheels of a vehicle, the first clutch being actuated by a first clutch actuating mechanism, and the second clutch being actuated by a second clutch actuating mechanism. A zero correction of the displacement measurement of the first and/or second clutch actuating mechanism is carried out in this context according to a predetermined strategy as a function of predetermined criteria.

The essential advantage is that the effects of the release system by adaptation or zero correction are also taken into account, in addition to the clutch properties, in the method of the present invention. In this way the changes—resulting, for example, from temperature changes—in the transmission behavior of the lever system of the transmission system of the clutch actuating mechanism or changes in the volume of a line of the transmission system of the clutch actuating mechanism filled with hydraulic fluid can be compensated.

SUMMARY OF THE INVENTION

In an especially advantageous design of the invention, when the vehicle is traveling, the active first clutch or the active second clutch is transmitting a torque and a gear is disengaged in the second partial transmission or first partial transmission, which is mounted downstream of the inactive second clutch or the inactive first clutch, the zero correction is carried out on the first clutch or the second clutch.

When the vehicle is traveling, it may also be advantageous, according to another embodiment of the invention, if with a gear engaged the active first clutch or the active second clutch transmits a torque and the gear is disengaged in the second partial transmission or the first partial transmission, which is mounted downstream from the inactive second clutch or the inactive first clutch, and thereafter the zero correction of the first clutch (A) and the second clutch (B) and the re-engagement of the same gear are carried out.

When the vehicle is stationary, according to a further modification of the invention, the zero correction of the first clutch and the second clutch is advantageously carried out in the partial first transmission and partial second transmission, which are mounted downstream from the first clutch and the second clutch.

According to an advantage of another variant of the invention, when the vehicle is stationary and a gear is disengaged in the first partial transmission or second partial transmission, which are mounted downstream from the first clutch or the second clutch, and a gear is engaged in the second partial transmission or first partial transmission, which are mounted downstream from the second clutch or the first clutch, the gear of the second partial transmission or first partial transmission, which are mounted downstream from the second clutch or the first clutch, is disengaged, the zero correction of the second clutch or the first clutch is carried out, and the same gear of the second partial transmission or first partial transmission, which are mounted downstream from the second clutch or the first clutch, is re-engaged.

In one embodiment of the invention, it may also be especially expedient, when the vehicle is stationary, the gear of the first partial transmission or second partial transmission, which is mounted downstream from the first clutch or the second clutch, is disengaged and the gear of the second partial transmission or first partial transmission, which is mounted downstream from the second clutch or the first clutch, is engaged, to carry out the disengagement of the gear of the second partial transmission or the first partial transmission and carry out the zero correction of the first clutch and the second clutch and thereafter re-engage the same gear of the second partial transmission or the first partial transmission.

Moreover, when the vehicle is stationary and gears are engaged in the first partial transmission or second partial transmission, which are mounted downstream from the first clutch or the second clutch, it is advantageously also possible to carry out the disengagement of the gear of the first partial transmission or second partial transmission, which are mounted downstream from the first clutch or the second clutch, and thereafter to carry out zero correction of the first clutch and the second clutch to re-engage the same gear of the first partial transmission or the second partial transmission.

According to an especially advantageous further development of the invention, the execution of zero correction under appropriate operating conditions is repeated at specified time intervals.

If the vehicle is traveling, i.e., if the active first clutch or the active second clutch is transmitting an engine torque, it is advantageously possible to adapt the first clutch or the second clutch first, depending on whose last successful zero correction occurred furthest in the past.

If the vehicle is stationary, in an advantageous further development of the invention, the zero correction can always be carried out on the first clutch or the second clutch, depending on whose gear is most probably used for starting off. The fact that the torque of this first clutch or second clutch determines the comfort of the subsequent starting off is taken into consideration in this determination.

If the vehicle is stationary, according to one design of the invention, zero corrections are always carried out simultaneously for the first clutch and the second clutch. In so doing, disruptive noises that are attributable to the disengagement of gears when the vehicle is stationary are minimized if both gears are simultaneously disengaged and the zero correction is then carried out.

According to one embodiment of the invention, the clutch characteristic advantageously can also be adapted via a sensing point adaptation. In so doing, the position of the clutch actuating mechanism at which the clutch begins to transmit a minimal torque is determined. This adaptation can be carried out with a gear engaged and the engine idling while the vehicle is stationary, that is, if the foot or hand brake is engaged. The clutch is slowly engaged until a minimal torque is transmitted. The idle speed stabilizer of the engine controller reacts to the engagement of the clutch with an increase in the engine torque by exactly the amount of the transmitted clutch torque (3–4 N-m), so that the idle speed remains constant. Using the reaction of the engine torque, the transmitted torque of the clutch and with it the sensing point may be determined and adapted.

In this context for the sensing point adaptation, the following especially advantageous strategies are conceivable when the vehicle is stationary. If a gear is engaged in the first and second partial transmission, the sensing point adaptation is carried out in succession. If a gear is engaged in the first partial transmission or second partial transmission, which are mounted downstream of the first clutch or second clutch, and no gear is engaged in the second partial transmission or first partial transmission, which are mounted downstream from the second clutch or first clutch, a gear is engaged in the second partial transmission or in the first partial transmission and the sensing point adaptation for the first clutch and the second clutch is carried out simultaneously. A sensing point adaptation can also expediently be configured in such a manner that the clutch whose last successful sensing point adaptation occurred furthest in the past is always adapted first. Finally, a sensing point adaptation can advantageously always be carried out first on the clutch that is connected upstream of the partial transmission in which the gear is most probably engaged for starting off.

BRIEF DESCRIPTION OF THE DRAWINGS

In the following, the invention and its embodiments are explained in detail in connection to the figures. In the drawing.

DETAILED DESCRIPTION OF THE PREFERRED EMBODIMENT

The following considerations led to the invention.

Because the actual clutch actuation is very far removed from the displacement measurement in the clutch actuator, the effects of the release system due to adaptation or zero correction of the displacement measurement must be taken into account in addition to the clutch characteristics. For example, due to temperature changes, the transmission behavior of the lever system of the transmission system of the electromechanical clutch actuating mechanism can change or the volume of a line of the clutch actuation mechanism filled with hydraulic fluid can change. Due to these changes, a zero correction of the displacement measurement must be carried out at regular intervals. This can be carried out by running up against the specific, singular position of the clutch that is recognizable as such by the clutch actuator. This position may likewise be, for example, the pressure point of the diaphragm spring at which the throwout force abruptly increases. This zero correction may be carried out while driving with the clutch and a gear engaged, or also when the vehicle is stationary, and the gear is disengaged. In this context, the clutch is briefly engaged.

The clutch characteristic can also be adapted via the sensing point adaptation. In this process, the position of the clutch actuator is determined at which the clutch begins to transmit a minimal torque. This adaptation can be carried out when the vehicle is stationary, that is, when the foot or handbrake is engaged, a gear is engaged and the engine is idling. The clutch is slowly engaged until the minimal torque is transmitted. The idle speed stabilizer of the engine controller reacts to the engagement of the clutch with an increase of the engine torque by exactly the amount of the transmitted clutch torque (3–4 N-m) so that the idle speed remains constant. Using the reaction of the engine torque, the transmitted torque of the clutch, and with it the position of the sensing point, may be determined and adapted. These strategies are redefined for the use of electromechanically controlled clutch actuators of the clutch actuating mechanism in twin-clutch systems or parallel shift transmissions.

Figure 1:
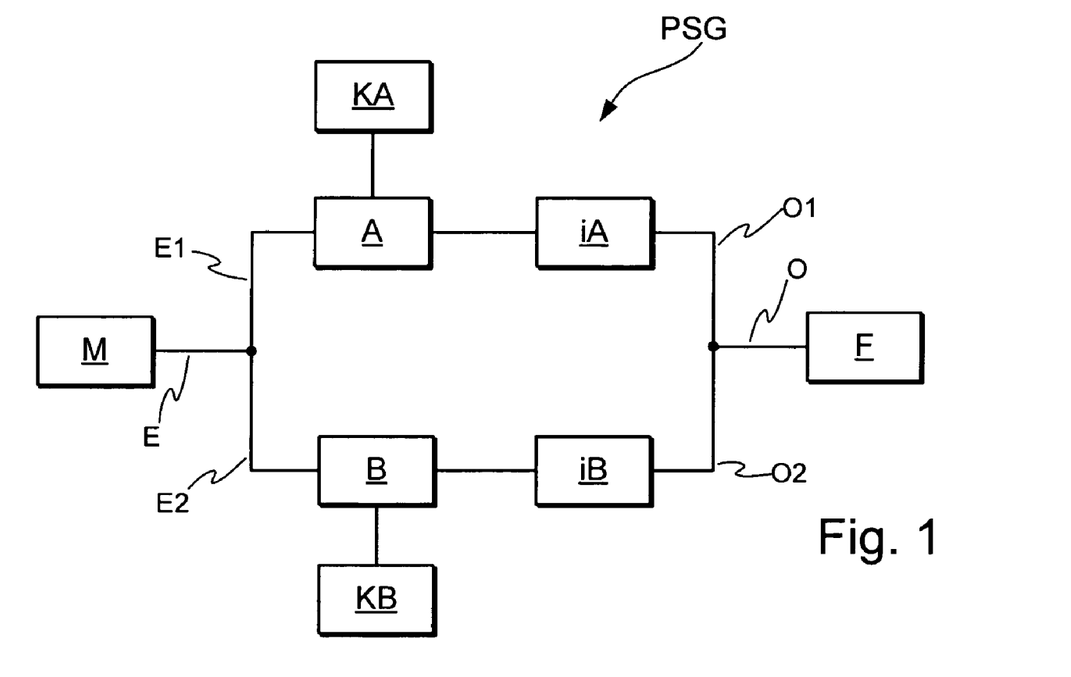
FIG. 1 shows a block diagram of a twin-clutch transmission in diagrammatic illustration.

First, the function and the structure of a twin-clutch transmission or a parallel-shift transmission PSG are explained in detail in FIG. 1. Internal combustion engine M transmits a torque T to input shaft E of parallel-shift transmission PSG and thus to a first input shaft E1, which is connected to a first clutch A, and a second input shaft E2, which is connected to a second clutch B. Clutch A is connected to a partial transmission iA, which typically shifts odd gears 1, 3 and 5. Clutch B is connected to partial transmission iB, which shifts the even gears 2, 4 and in some cases reverse. Output shaft O1 of partial transmission iA and output shaft O2 of partial transmission iB are jointly connected via output shaft O of parallel shift transmission PSG to vehicle wheels F.

In the driving state, a clutch A or B is closed and transmits the engine torque via an engaged gear of partial transmission iA or iB mounted downstream thereof to output shaft O. The other inactive clutch B or A is then either disengaged when the gear of the partial transmission mounted downstream thereof is engaged or engaged when the gear of the partial transmission mounted downstream thereof is disengaged.

The torques transmitted by clutches A and B are controlled by two independent clutch actuators KA and KB.

Within the context of the presented method, the following strategies are conceivable for carrying out the zero correction of the displacement measurement of the clutch actuators.

Figure 3:
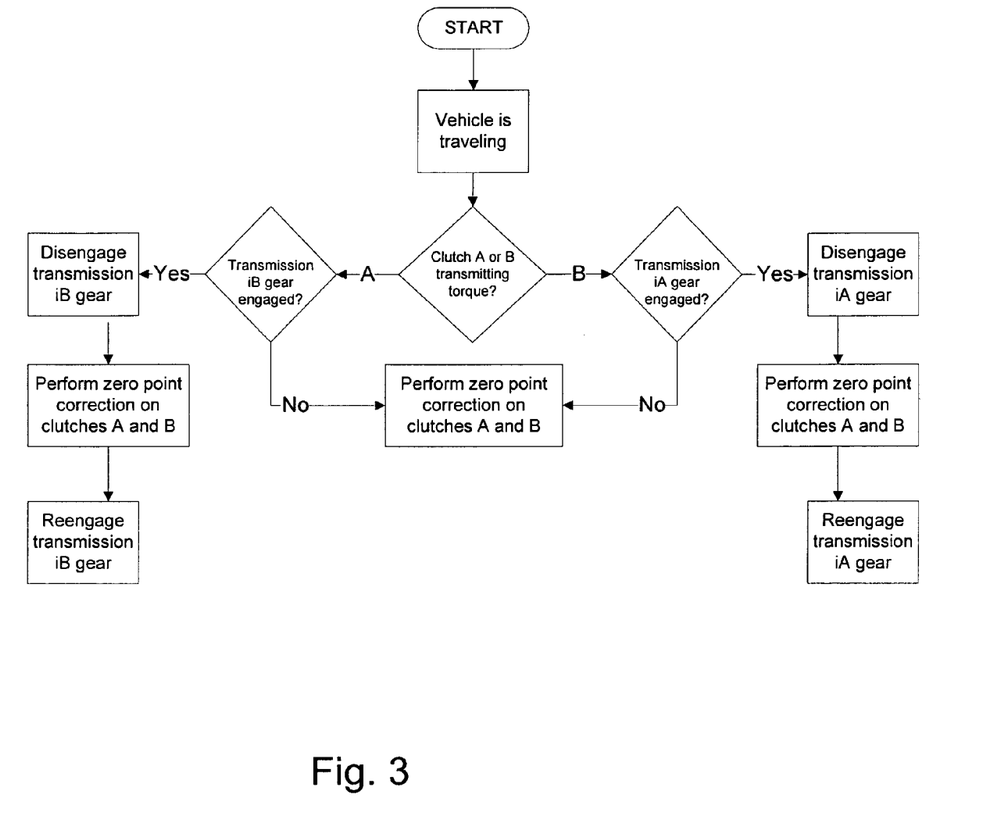
FIG. 3 shows a flow diagram for a zero point correction when a vehicle is moving.
Figure 4:
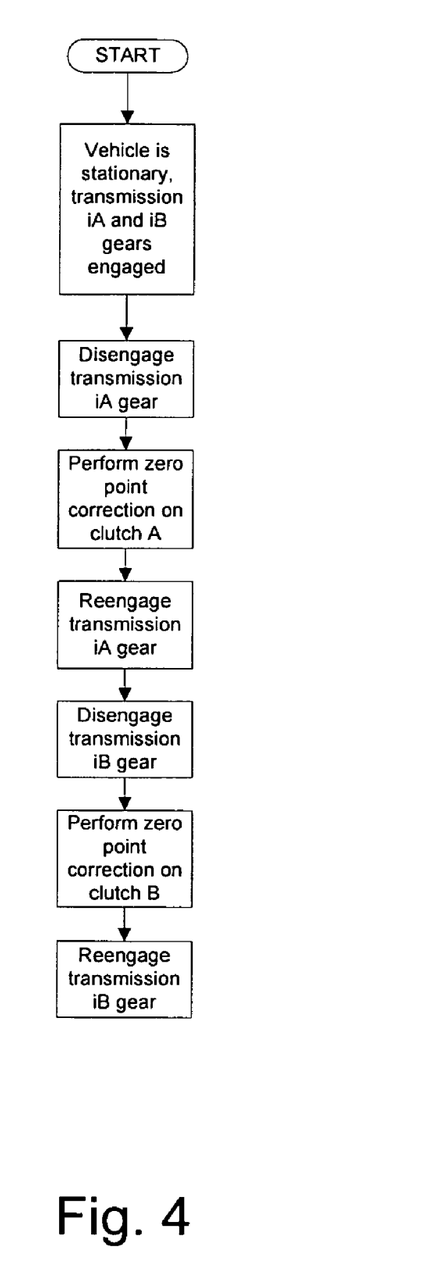
FIG. 4 shows a flow diagram for a zero point correction when a vehicle is stationary and transmission iA and iB gears engaged.
Figure 5:
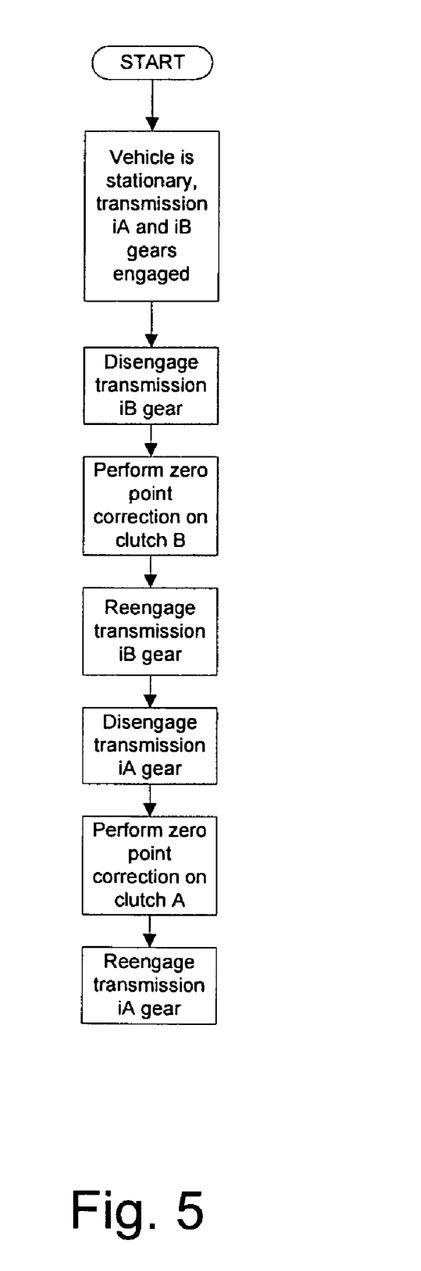
FIG. 5 shows a flow diagram for another zero point correction when a vehicle is stationary and transmission iA and iB gears engaged.
Figure 6:
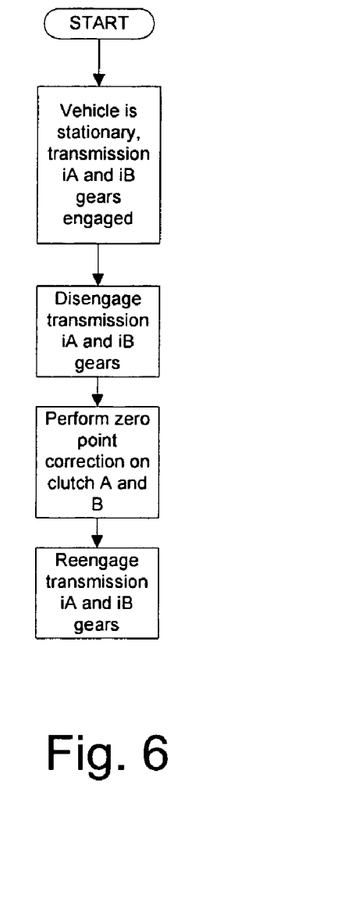
FIG. 6 shows a flow diagram for yet another zero point correction when a vehicle is stationary and transmission iA and iB gears engaged.
Figure 7:
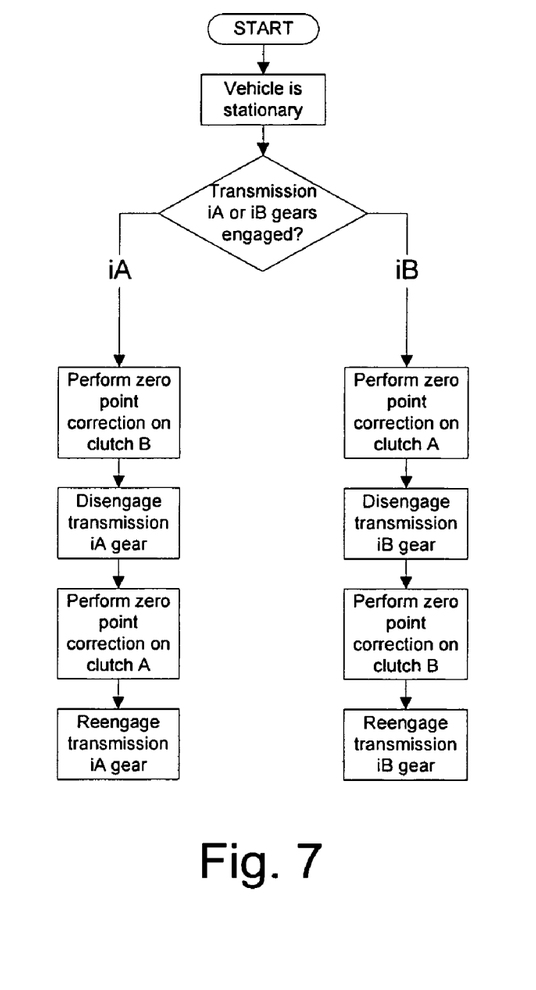
FIG. 7 shows a flow diagram for a zero point correction when a vehicle is stationary and transmission iA or iB gears engaged.
Figure 8:
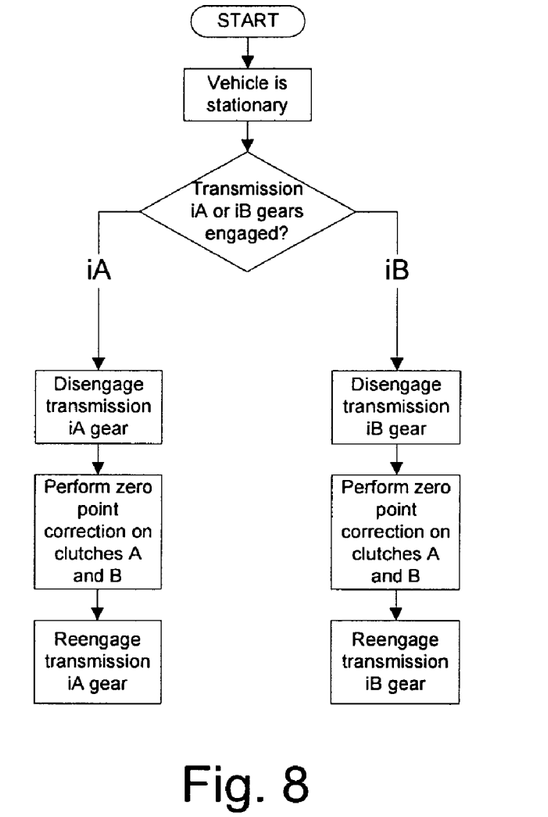
FIG. 8 shows a flow diagram for another zero point correction when a vehicle is stationary and transmission iA or iB gears engaged; and, FIG. 9 shows a flow diagram for a zero point correction when a vehicle is stationary and transmission iA and iB are disengaged.
Figure 9:
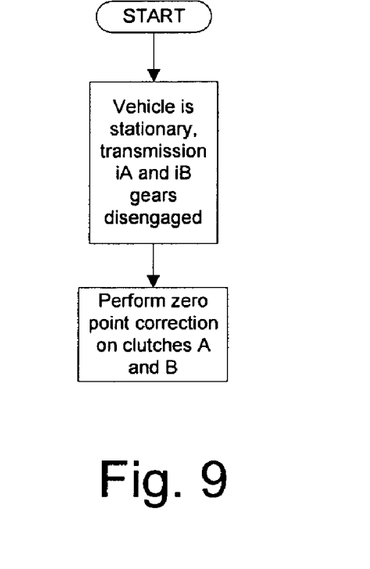

Referring to FIG. 3, when the vehicle is traveling, if active clutch A or B transmits an engine torque, the zero correction occurs as follows:

1. When a gear in partial transmission iB or iA, which is mounted downstream of inactive clutch B or A, is disengaged, zero correction is carried out on clutches A and B.
2. When the gear in partial transmission iB or iA, which is mounted downstream of inactive clutch B or A, is engaged, the gear of the partial transmission mounted downstream of inactive clutch A or B is disengaged. Thereafter, the zero correction of clutches A and B and the re-engagement of the same gear of partial transmission iB or iA, which is mounted downstream of inactive clutch B or A, takes place.
2. When the gear in partial transmission iB or iA, which is mounted downstream of inactive clutch B or A, is engaged, the gear of the partial transmission mounted downstream of inactive clutch A or B is disengaged. Thereafter, the zero correction of clutches A and B and the re-engagement of the same gear of partial transmission iB or iA, which is mounted downstream of inactive clutch B or A, takes place.

Referring to FIGS. 4, 5, 6, 7, 8 and 9, if the vehicle is stationary, according to the present invention it is possible to proceed as follows:

1. When gears in partial transmissions iB and iA, which are mounted downstream of clutches B and A, are disengaged, the zero correction of clutches A and B is carried out.
2. When the gear in partial transmission iA or iB, which is mounted downstream of clutch A or B, is disengaged and the gear in partial transmission iB or iA, which is mounted downstream of clutch B or A, is engaged, the zero correction of clutch A or B is carried out, the gear of partial transmission iB or iA, which is mounted downstream of clutch B or A, is disengaged, the zero correction of clutch B or A is carried out, and, finally, the gear of partial transmission iB or iA, which is mounted downstream of clutch B or A, is re-engaged.
3. When the gear of partial transmission iA or iB, which is mounted downstream of clutch A or B, is disengaged and the gear in partial transmission iB or iA, which is mounted downstream of clutch B or A, is engaged, the disengagement of the gear of partial transmission iB or iA occurs. The zero correction of clutches A and B is carried out and thereafter the same gear of partial transmission iB or iA is re-engaged.
4. When the gears in partial transmission iA and iB, which are mounted downstream of clutch A and B, are engaged, the disengagement of the gear of partial transmission iA or iB, which is mounted downstream of clutch A or B, occurs. Thereafter, the zero correction of clutch A or B is carried out and the same gear of partial transmission iA or iB is re-engaged. The gear of partial transmission iB or iA, which is mounted downstream of clutch B or A, is disengaged, whereupon the zero correction of clutch B or A is carried out and the same gear of partial transmission iB or iA is re-engaged.
5. When the gears in partial transmission iA and iB, which are mounted downstream of clutch A and B, are engaged, the disengagement of the gears in both partial transmissions iA and iB, which are mounted downstream of clutches A and B, occurs. The zero correction of clutches A and B is carried out, and the same gears of partial transmission iA and iB are re-engaged.

The execution of the zero correction can preferably be repeated under valid starting conditions at specific time intervals. In this context, the sequence of clutches A or B can be adapted to the momentary or future driving situations. For this purpose the following strategies can preferably be carried out. To accomplish this, the following strategies may preferably be carried out.

If the vehicle is traveling, i.e., if an active clutch A or B is transmitting an engine torque, the clutch A or B whose last successful zero correction was furthest in the past is always adapted first.

If the vehicle is stationary, the procedure can be as follows:

1. The zero correction is always carried out on clutch A or B depending on whose gear is most probably used for starting off. In this context, the fact that the torque of this clutch A or B determines the comfort of the subsequent starting off is taken into account.
2. Zero corrections are always carried out simultaneously on clutches A and B. With this manner of procedure, the fact that the disengagement of gears in a stationary state is always connected with disruptive noises is taken into consideration. These noises are minimized if both gears are simultaneously disengaged and the zero correction is then carried out.

For the sensing point adaptation, which can only be carried out when the vehicle is stationary, the following possibilities are conceivable. This is explained in detail in connection with FIGS. 2*a*, 2*b* and 2*c*.

Figure 2A:
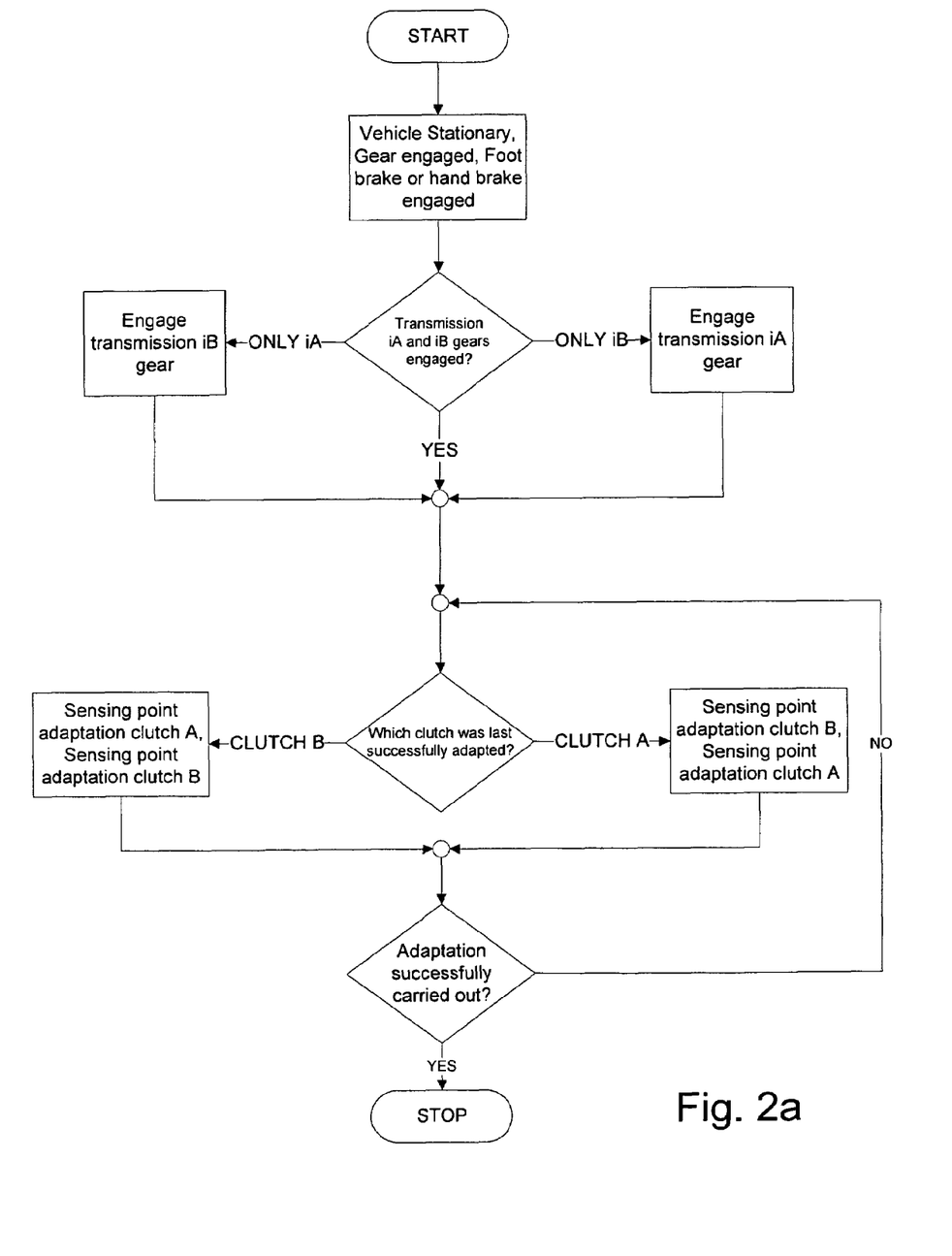
FIG. 2a shows a flow diagram for a consecutive sensing point adaptation when a vehicle is stationary based upon which clutch was last successfully adapted.
Figure 2B:
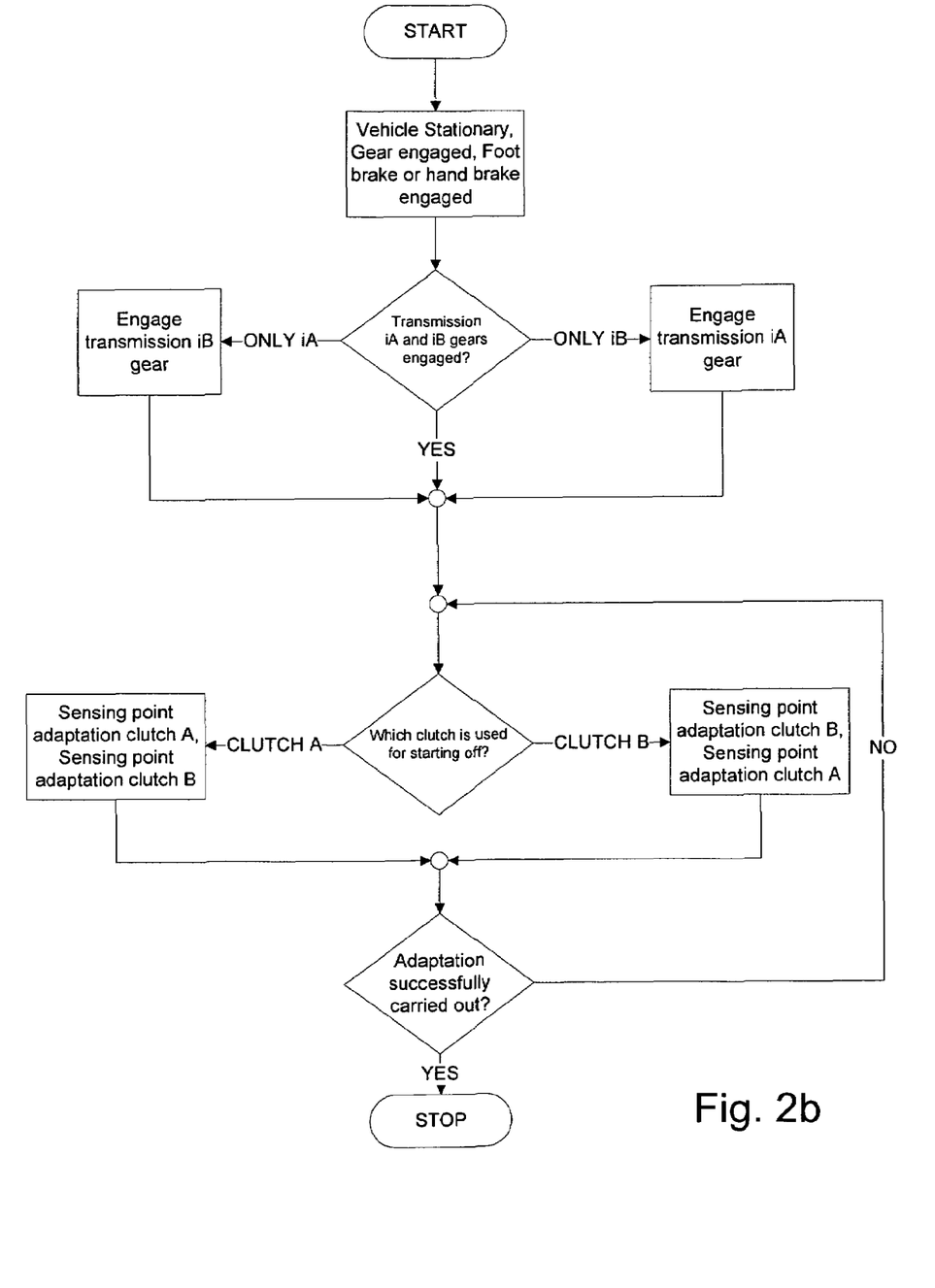
FIG. 2b shows a flow diagram for a consecutive sensing point adaptation when a vehicle is stationary based upon which clutch is used for starting off.
Figure 2C:
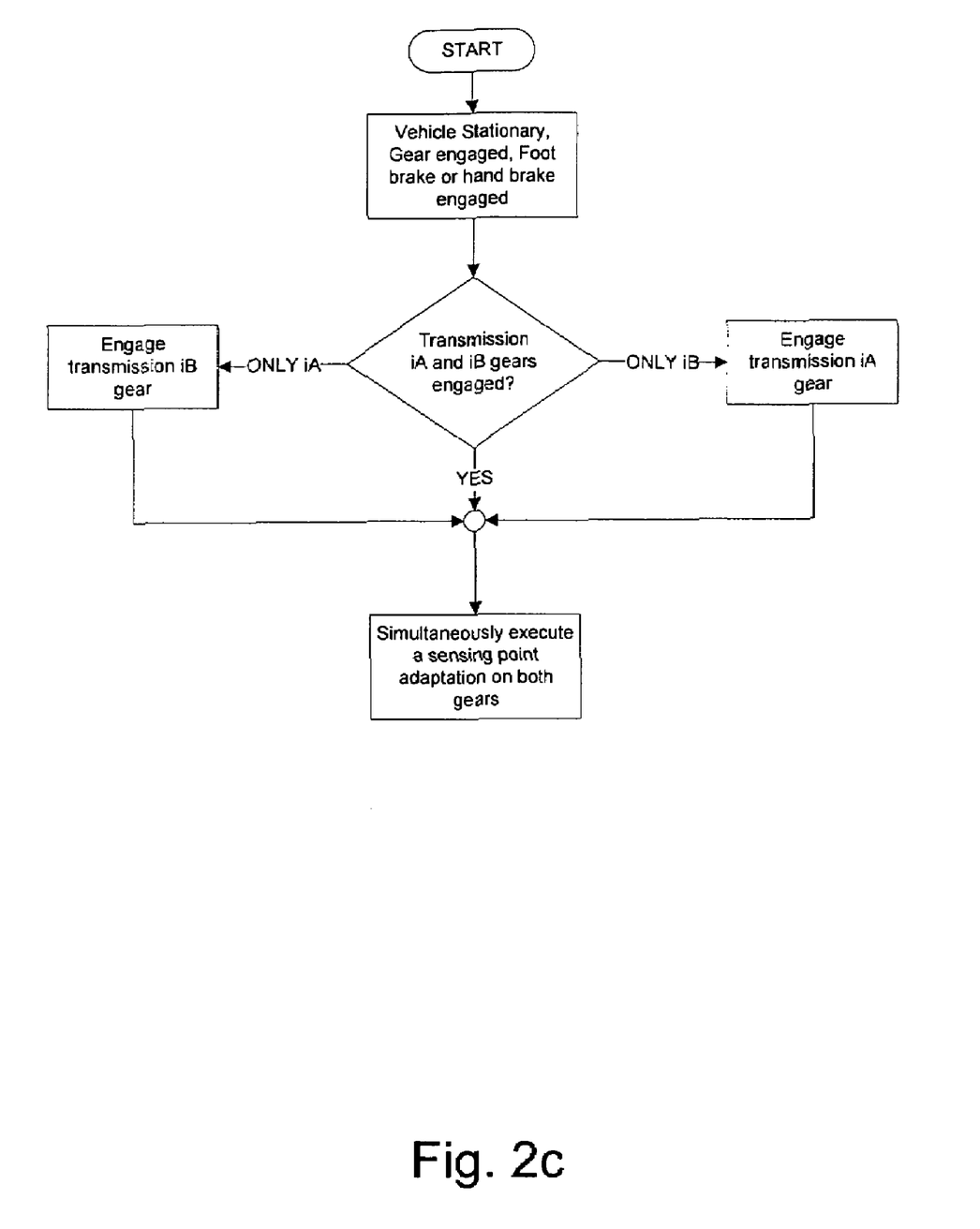
FIG. 2c shows a flow diagram for a simultaneous sensing point adaptation when a vehicle is stationary.

1. If a gear is engaged in both partial transmissions, the sensing point adaptation can be carried out one after the other.
2. If a gear is engaged in partial transmission iA or iB, which is mounted downstream of clutch A or B, and no gear is engaged in partial transmission iB or iA, which is mounted downstream of clutch B or A, a gear is engaged in partial transmission iB or iA and the sensing point adaptation for clutches A and B is carried out simultaneously.
3. In a sensing point adaptation, the clutch A or B whose last successful sensing point adaptation was furthest in the past is always adapted first.
4. The sensing point adaptation is always carried out on the clutch A or B, which is mounted upstream of the partial transmission iA or iB, in which the gear for starting off is most probably engaged.

Sensing point adaptation methods 1 through 4 are best understood in view of FIGS. 2a, 2b and 2c. All four methods apply to a stationary vehicle having at least one engaged gear in a partial transmission, thus the methods may be performed when both partial transmissions have an engaged gear. The method begins with a determination of whether one or both partial transmissions have an engaged gear. If only one partial transmission includes an engaged gear, the disengaged gear of the other partial transmission is engaged. If both partial transmissions have engaged gears, no change to the gears is required and the methods proceed to the next stage. Subsequent to ensuring that both partial transmissions have an engaged gear, the sensing point adaptation may either be simultaneous or consecutive. When simultaneously adapting, no further determination is required, and both clutches are adapted. Alternatively, if consecutive adaptation is selected, the method of determining the first clutch to adapt is either pursuant to the last successful adaptation or the starting off gear methods. According to the last successful adaptation method, the order of sensing point adaptation is based on which clutch was most recently or most remotely adapted. Thus, if clutch A was the last successfully adapted clutch, then the sensing point adaptation is first performed on clutch B, and subsequently on clutch A. While contrarily, if clutch B was the last successfully adapted clutch, then the sensing point adaptation is first performed on clutch A, and subsequently on clutch B. Alternatively, the starting off gear method includes determining the first clutch to adapt based on which clutch is used for starting off the vehicle from its stationary condition. Thus, if clutch A is the clutch used for starting off, then the sensing point adaptation is first performed on clutch A, and subsequently on clutch B. While contrarily, if clutch B is the clutch used for starting off, then the sensing point adaptation is first performed on clutch B, and subsequently on clutch A. Following either consecutive sensing point adaptation method, a determination is made as to whether or not the adaptations were successfully carried out. If the adaptation is not successful, the portions of the methods after gear engagement are repeated, while if the adaptation is successful, the methods are complete.

The patent claims submitted with the application are proposed formulations without prejudice to the achievement of further patent protection. The applicant reserves the right to submit claims for further combinations of features previously only disclosed in the description and/or the drawings.

References used in dependent claims refer to the further development of the subject matter of the principal claim via the features of the particular dependent claims; they are not to be understood as a renunciation of achieving independent protection for the combination of features for the dependent claims that are referenced.

Since the subject matter of the dependent claims may constitute separate and independent inventions in relation to the state of the art on the priority date, the applicant reserves the right to make them the subject matter of independent claims or division declarations. Furthermore, they may also contain independent inventions that have a design that is independent of the subject matter of the preceding dependent claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in a general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

What we claim is:

1. A method for adapting clutch characteristics in a vehicle having a twin-clutch system that comprises a first branch having a first clutch and a first partial transmission mounted downstream thereof, and a second branch having a second clutch and a second partial transmission mounted downstream thereof, said first and second partial transmissions comprising at least a gear A and at least a gear B, respectively, the first and second branches operatively arranged for connection to an engine on an input side and to vehicle wheels of the vehicle on an output side, and the first clutch being operated by a first clutch actuating mechanism and the second clutch being operated by a second clutch actuating mechanism, said method comprising the step of:
   executing a zero correction of a displacement measurement of the first and/or second clutch actuating mechanism according to a predetermined strategy as a function of predetermined criteria.

2. A method for adapting clutch characteristics when a vehicle is moving, said vehicle having a twin-clutch system that comprises a first branch having a first clutch and a first partial transmission mounted downstream thereof, and a second branch having a second clutch and a second partial transmission mounted downstream thereof, said first and second partial transmissions comprising at least a gear A and at least a gear B, respectively, the first and second branches operatively arranged for connection to an engine on an input side and to vehicle wheels of the vehicle on an output side, and the first clutch being operated by a first clutch actuating mechanism and the second clutch being operated by a second clutch actuating mechanism, said method comprising the steps of:
   (a) transmitting a torque from the engine to the vehicle wheels via an active clutch mounted upstream from an engaged gear, wherein said active clutch is the first or the second clutch, the remaining clutch is an inactive clutch, said engaged gear, depends upon the active clutch selection and is gear A or gear B, the remaining gear is a disengaged gear; and,
   (b) executing a zero correction on the first and second clutches.

3. A method for adapting clutch characteristics when a vehicle is moving, said vehicle having a twin-clutch system that comprises a first branch having a first clutch and a first partial transmission mounted downstream thereof, and a second branch having a second clutch and a second partial transmission mounted downstream thereof, said first and second partial transmissions comprising at least a gear A and at least a gear B, respectively, the first and second branches operatively arranged for connection to an engine on an input side and to vehicle wheels of the vehicle on an output side, and the first clutch being operated by a first clutch actuating mechanism and the second clutch being operated by a second clutch actuating mechanism, said method comprising the steps of:

(a) transmitting a torque from the engine to the vehicle wheels via an active clutch, wherein said active clutch is the first or the second clutch, the remaining clutch is an inactive clutch, said gear A and gear B are engaged, an active gear is downstream from said active clutch, said active gear is gear A or gear B, and an inactive gear is downstream from said inactive clutch, said inactive gear is gear A or gear B;

(b) disengaging said inactive gear;

(c) executing a zero correction on the first and second clutches; and, (d) re-engaging said inactive gear.

4. A method for adapting clutch characteristics when a vehicle is stationary, said vehicle having a twin-clutch system that comprises a first branch having a first clutch and a first partial transmission mounted downstream thereof, and a second branch having a second clutch and a second partial transmission mounted downstream thereof, said first and second partial transmissions comprising at least a gear A and at least a gear B, respectively, said gears A and B disengaged, the first and second branches operatively arranged for connection to an engine on an input side and to vehicle wheels of the vehicle on an output side, and the first clutch being operated by a first clutch actuating mechanism and the second clutch being operated by a second clutch actuating mechanism, said method comprising the step of:

(a) executing a zero correction on the first and second clutches.

5. A method for adapting clutch characteristics when a vehicle is stationary, said vehicle having a twin-clutch system that comprises a first branch having a first clutch and a first partial transmission mounted downstream thereof, and a second branch having a second clutch and a second partial transmission mounted downstream thereof, said first and second partial transmissions comprising at least a gear A and at least a gear B, respectively, an engaged gear and a disengaged gear, said engaged gear is gear A or gear B, and the remaining gear is said disengaged gear, the first and second branches operatively arranged for connection to an engine on an input side and to vehicle wheels of the vehicle on an output side, and the first clutch being operated by a first clutch actuating mechanism and the second clutch being operated by a second clutch actuating mechanism, said method comprising the steps of:

(a) executing a zero correction on a disengaged clutch, wherein said disengaged clutch is upstream from the disengaged gear and is the first clutch or the second clutch, the remaining clutch is an engaged clutch;

(b) disengaging said engaged gear;

(c) executing a zero correction on said engaged clutch; and, (d) re-engaging said engaged gear.

6. A method for adapting clutch characteristics when a vehicle is stationary, said vehicle having a twin-clutch system that comprises a first branch having a first clutch and a first partial transmission mounted downstream thereof, and a second branch having a second clutch and a second partial transmission mounted downstream thereof, said first and second partial transmissions comprising at least a gear A and at least a gear B, respectively, an engaged gear and a disengaged gear, said engaged gear is gear A or gear B, and the remaining gear is said disengaged gear, the first and second branches operatively arranged for connection to an engine on an input side and to vehicle wheels of the vehicle on an output side, and the first clutch being operated by a first clutch actuating mechanism and the second clutch being operated by a second clutch actuating mechanism, said method comprising the steps of:

(a) disengaging said engaged gear;

(b) executing a zero correction on the first and second clutches; and, (c) re-engaging said engaged gear.

7. A method for adapting clutch characteristics when a vehicle is stationary, said vehicle having a twin-clutch system that comprises a first branch having a first clutch and a first partial transmission mounted downstream thereof, and a second branch having a second clutch and a second partial transmission mounted downstream thereof, said first and second partial transmissions comprising at least a gear A and at least a gear B, respectively, said gears A and B engaged, the first and second branches operatively arranged for connection to an engine on an input side and to vehicle wheels of the vehicle on an output side, and the first clutch being operated by a first clutch actuating mechanism and the second clutch being operated by a second clutch actuating mechanism, said method comprising the steps of:

(a) disengaging a first disengaged gear, wherein said first disengaged gear is gear A or gear B, the remaining gear is a second disengaged gear;

(b) executing a zero correction on a first disengaged clutch, wherein said first disengaged clutch is mounted upstream from said first disengaged gear and is the first clutch or the second clutch, the remaining clutch is a second disengaged clutch;

(c) engaging said first disengaged gear;

(d) disengaging said second disengaged gear;

(e) executing a zero correction on the second disengaged clutch; and, (f) engaging said second disengaged gear.

8. A method for adapting clutch characteristics when a vehicle is stationary, said vehicle having a twin-clutch system that comprises a first branch having a first clutch and a first partial transmission mounted downstream thereof, and a second branch having a second clutch and a second partial transmission mounted downstream thereof, said first and second partial transmissions comprising at least a gear A and at least a gear B, respectively, said gears A and B engaged, the first and second branches operatively arranged for connection to an engine on an input side and to vehicle wheels of the vehicle on an output side, and the first clutch being operated by a first clutch actuating mechanism and the second clutch being operated by a second clutch actuating mechanism, said method comprising the steps of:

(a) disengaging said gears A and B;

(b) executing a zero correction on the first and second clutches; and, (c) re-engaging said gears A and B.

9. The method as described in any of claims 1–8, wherein execution of the zero correction under appropriate operating conditions is repeated at specific time intervals.

10. The method as described in claim 2 or 3, wherein the first clutch or the second clutch is adapted first, depending on whose last successful zero correction was furthest in the past.

11. The method as described in any of claims 4–8, wherein the zero correction is carried out on the first clutch or the second clutch, depending on whose gear is most probable for starting off.

12. The method as described in any of claims 4, 6 or 8, wherein zero corrections for the first clutch and second clutch are always carried out simultaneously.

13. The method as described in claim 8, further comprising the step of:

carrying out a sensing point adaptation, wherein the sensing point adaptation is carried out in succession.

14. The method as described in claims 5 or 6, further comprising the steps of:

engaging the disengaged gear; and, carrying out a sensing point adaptation for the first clutch and the second clutch simultaneously.

15. The method as described in any of claims 4–8, further comprising the step of:

carrying out a sensing point adaptation in such a manner that the clutch whose last successful sensing point adaptation was furthest in the past is always adapted first.

16. The method as described in any of claims 4–8, further comprising the step of:

carrying out a sensing point adaptation on the clutch that is mounted upstream of the partial transmission in which the gear for starting off is most probably engaged.

* * * * *